US008121598B2

(12) United States Patent
Hamel et al.

(10) Patent No.: US 8,121,598 B2
(45) Date of Patent: Feb. 21, 2012

(54) SCRAMBLING CODE ALLOCATION AND HAND-IN FOR WIRELESS NETWORK RADIO ACCESS POINTS

(75) Inventors: Eric P. Hamel, Paris (FR); Anton Okmyanskiy, Vancouver (CA); Rajesh Pazhyannur, Sunnyvale, CA (US); Mark Grayson, Maidenhead (GB)

(73) Assignee: Cisco Technology, Inc., San Jose, CA (US)

( * ) Notice: Subject to any disclaimer, the term of this patent is extended or adjusted under 35 U.S.C. 154(b) by 387 days.

(21) Appl. No.: 12/509,561

(22) Filed: Jul. 27, 2009

(65) Prior Publication Data

US 2011/0019638 A1     Jan. 27, 2011

(51) Int. Cl.
    *H04W 4/00*         (2009.01)

(52) U.S. Cl. .................. 455/435.1; 455/507; 455/509; 455/446; 455/436

(58) Field of Classification Search ............... 455/435.1, 455/507, 509, 446, 436
See application file for complete search history.

(56) References Cited

U.S. PATENT DOCUMENTS

| | | | | |
|---|---|---|---|---|
| 2010/0093354 | A1* | 4/2010 | Agashe et al. | 455/436 |
| 2010/0178912 | A1* | 7/2010 | Gunnarsson et al. | 455/423 |
| 2011/0039539 | A1* | 2/2011 | Maida et al. | 455/422.1 |
| 2011/0124365 | A1* | 5/2011 | Gresset et al. | 455/522 |

OTHER PUBLICATIONS

3GPP TS 25.469, 3GPP TS 25.469, 3rd Generation Partnership Project, Technical Specification Group Radio Access Network, UTRAN Iuh interface Home Node B Application Part (HNBAP) signalling (Release 8), Jun. 2009, pp. 1-59.
3GPP TR 25.931, 3GPP TR 25.931, 3rd Generation Partnership Project, Technical Specification Group RAN, UTRAN functions, examples on signalling procedures (Release 6), Mar. 2006, pp. 1-121.

* cited by examiner

*Primary Examiner* — Barry Taylor
(74) *Attorney, Agent, or Firm* — Edell, Shapiro & Finnan, LLC

(57) ABSTRACT

Techniques are provided herein to allow more than a fixed number of radio access point devices to be deployed within a macro cell. At a controller apparatus, a registration request is received from a radio access point device configured to operate in a wireless network to serve one or more wireless client devices in the wireless network in respective relatively small coverage areas. The registration request comprises a macro cell identifier associated with a macro base station apparatus configured to operate in the wireless network to serve one or more wireless client devices in a relatively large coverage area, a radio access point cell identifier associated with the radio access point device, and a particular primary scrambling code selected for use by the radio access point device. When the particular primary scrambling code is not available for use, methods are provided to allocate it in a shared manner but without degrading handover service.

23 Claims, 7 Drawing Sheets

US 8,121,598 B2

SCRAMBLING CODE ALLOCATION AND HAND-IN FOR WIRELESS NETWORK RADIO ACCESS POINTS

TECHNICAL FIELD

The present disclosure relates to wireless communication networks, and more particularly to handover of service in a wireless network from a macro base station to a radio access point that serves a smaller coverage area.

BACKGROUND

In wide area wireless communication networks, relatively high power base station devices are provided to serve wireless client devices. Each base station device is capable of serving wireless client devices in a coverage area that is primarily determined by the power of the signal it can transmit. Wireless service to client devices located within large buildings becomes degraded because the client device has difficulty receiving a signal from the base station, even if the building is well within the coverage area of the base station.

To augment the coverage of the wireless network, wireless transceiver devices with relatively small coverage areas (and serving capacities) are deployed. Depending on their coverage area and serving capacities, these wireless transceiver devices are referred to as "femto" cell or "pico" cell access point devices. For simplicity and generality, the term radio access point (RAP) device is meant to refer to a wireless transceiver device that is configured to serve wireless client devices over relatively small coverage areas and with generally less capacity as compared to a macro base station that is configured to serve a relatively large coverage area ("macro cell") and consequently many more client devices. The RAP devices may be deployed inside or near buildings to serve client devices where signals from a macro base station are too weak. The process of handover from a macro base station to a RAP device is referred to here as hand-in.

To facilitate the hand-in, the client device is instructed to perform radio measurements on various channels and report back signal strength for each frequency channel and primary scrambling code (PSC) on which a broadcast signal from a macro base station or RAP device was detected. A radio network controller associated with the macro base station receives the measurement reports and makes decisions to handover the client device to a RAP device based on signal quality. The radio network controller is configured to associate each frequency channel/PSC in the measurement report that comprises a target cell identifier.

According to current 3GPP wireless communication standards, the neighbor cell list broadcasted by a macro base station (and by the RAP device) to client devices contains a list of frequency channel and PSC combinations. The number of entries in this list is limited, e.g., 32 intra-frequency entries and 32 inter-frequency entries. In RAP device deployments there are situations when there are insufficient neighbor cell entries to uniquely identify each enterprise RAP cell within a macro cell coverage area.

DESCRIPTION OF EXAMPLE EMBODIMENTS

Overview

Techniques are provided herein to allow more than a fixed number of radio access point devices to be deployed within a macro cell. At a controller apparatus, a registration request is received from a radio access point device configured to operate in a wireless network to serve one or more wireless client devices in the wireless network in respective relatively small coverage areas. The registration request comprises a macro cell identifier associated with a macro base station apparatus configured to operate in the wireless network to serve one or more wireless client devices in a relatively large coverage area, a radio access point cell identifier associated with the radio access point device, and a particular primary scrambling code selected for use by the radio access point device. The macro cell identifier and the particular primary scrambling code contained in the registration request received from the radio access point device are compared with stored data that associates macro cell identifiers and primary scrambling codes already in use or otherwise restricted for use. When it is determined that the particular primary scrambling code is already in use for the macro cell identifier in the registration request, then a radio access point cell identifier for the radio access point device that has been previously registered with the particular primary scrambling code and macro cell identifier is determined. An indication is stored that the radio access point cell identifier for the radio access point device that has been previously registered with the particular primary scrambling code is a shared radio access point cell identifier and that the shared radio access point cell identifier is associated with more than one radio access point device.

Example Embodiments

Figure 1:
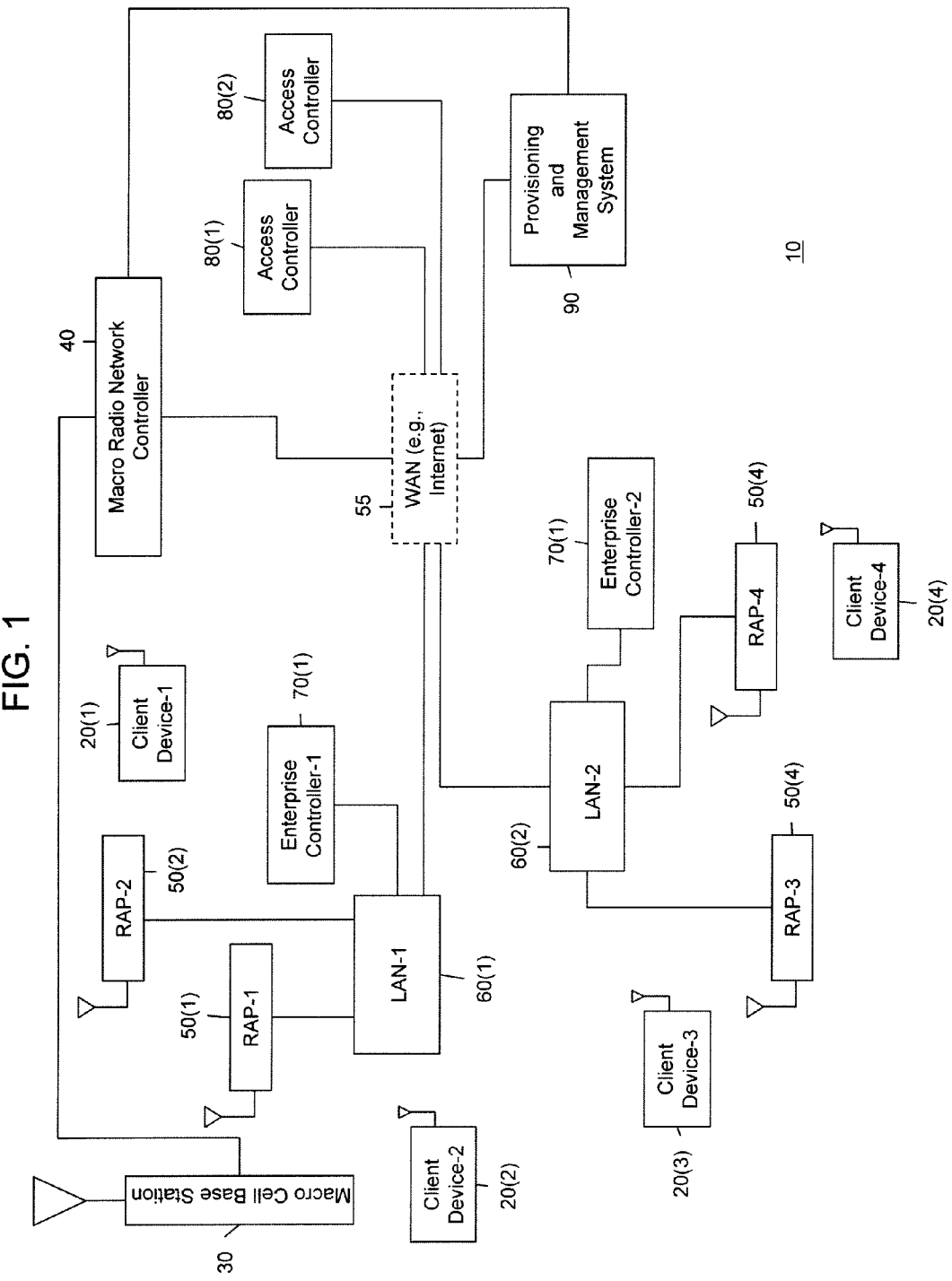
FIG. 1 is a block diagram that illustrates a wireless communication network and related infrastructure elements configured to perform a primary scrambling code provisioning coordination and hand-in process.

Referring first to FIG. 1, a block diagram is shown of a wireless communication network 10 including several infrastructure elements that are configured to manage operations for the network 10 and to facilitate certain functions described herein. The network 10 is a wide area wireless communication network, such as one that is built according to the "3G" wireless communication standard specifications. The network 10 is designed to provide a variety of voice and data services to wireless client devices, examples of which are shown at reference numerals 20(1)-20(4). Wireless client devices are also known as user equipment (UE) in the 3G terminology. In order to serve wireless client devices, there are long range or "macro" cell base stations that are configured to serve relatively large coverage areas (measured in miles or km). An example of a macro cell base station is shown at 30. Only one macro cell base station 30 is shown in FIG. 1 for simplicity but it should be understood that there are numerous such devices in a wireless network deployment, each of which connects to a macro radio network controller 40. The macro radio network controller 40 interfaces voice calls to a public telephone network (not shown) and interfaces voice or data sessions to a wide area network (WAN), e.g., the Internet, shown at reference numeral 55.

Recently, efforts have been made to improve the delivery of wireless services to client devices when they are out of range of a macro cell tower because they are located within a building for example. Wireless service to client devices located within large buildings becomes degraded because the client device has difficulty receiving a signal from the base station, even if the building is well within the coverage area of the base station. Accordingly, wireless transceiver devices with relatively small coverage areas (and serving capacities) are deployed. Depending on their coverage area and serving capacities, these wireless transceiver devices are referred to as "femto" cell or "pico" cell access point devices. For simplicity and generality, the term radio access point (RAP) device is meant to refer to a wireless transceiver device that is configured to serve wireless client devices over relatively small coverage areas and with generally less capacity as compared to a macro cell tower. Another term for a RAP device is a micro base station. Examples of RAP devices are shown at 50(l)-50(4). In the 3G terminology, these RAP devices are referred to Home Node B (HNB) devices. Again, the RAP devices are configured to provide the same type of wireless services to client devices when the wireless client devices are out of range of a macro cell tower. The relatively small coverage area of a RAP device is measured in terms of feet or meters.

The RAP devices may be deployed within or near a building (e.g., small or large business enterprise or a home) and are connected to a wired local area network (LAN). For example, RAP devices 50(1) and 50(2) are connected to a first LAN 60(1) and RAP devices 50(3) and 50(4) are connected to a second LAN 60(2). There may be several more RAP devices, but for simplicity they are not shown in FIG. 1. There is an enterprise controller associated with each group of deployed RAP devices. For example, FIG. 1 shows an enterprise controller 70(1) connected to the LAN 60(1) for RAP devices 50(1) and 50(2) and an EC 70(2) connected to LAN 60(2) for RAP devices 50(3) and 50(4). Each of the LANs 60(1) and 60(2) are connected to the Internet 55.

There are additional infrastructure elements shown in FIG. 1 to assist in managing the network 10. For example, there are one or more access controllers (also known as gateway devices), two of which are shown at 80(1) and 80(2) in FIG. 1. An access controller is assigned to a group of RAP devices and serves as a gateway for control messaging and provisioning to/from the RAP devices (including the enterprise controller) from/to the macro cellular core network elements. A provisioning and management system 90 is also provided that serves as a more centralized control point to provision RAP devices in the network 10 and also to provide a user interface point for a network administrator to provide configuration commands/data as well as to view the status of the network 10. The provisioning and management system 90 may communicate with the appropriate access controller which in turn communicates with the appropriate enterprise controller for the one or more RAP devices to which the command is to be sent.

In accordance with the 3G wireless network standards, each macro base station cell or RAP device broadcasts a neighbor list containing a list of frequency channels and scrambling codes of its neighbors to client devices in order to facilitate handover from one RAP device to another RAP device, or to/from a macro base station. Thus, the neighbor list serves as a list of identifiers of RAP devices that are candidates for handover of service with respect to a client device within in the coverage area of the RAP device or macro base station that is currently serving that client device. The client device performs measurements on radio signals received on these channels and reports results back to the serving RAP device or serving macro base station.

As explained above, according to current 3GPP wireless communication standards, the neighbor cell list broadcasted by a macro base station and RAP device to client devices contains a list of frequency channel and PSC combinations. The number of entries in this list is limited, e.g., 32 intra-frequency entries and 32 inter-frequency entries. In RAP device deployments there are situations when there are insufficient neighbor cell entries to uniquely identify each enterprise RAP cell within a macro cell coverage area.

A scrambling code is a code used to distinguish one cell (macro cell or RAP cell) from another. The scrambling code is defined by a code comprising a fixed number of bits. All of the available codes are divided into groups, each group comprising a so-called primary scrambling code and a plurality of secondary scrambling codes. A macro cell base station or RAP device uses a primary scrambling code (PSC) for downlink transmissions to be heard by all client devices, i.e., UEs, in the cell. There are also a fixed number of channel frequencies available to a macro base station or RAP device. Accordingly, techniques are needed to address the situation where there are insufficient neighbor cell entries to uniquely identify each enterprise RAP cell within a macro cell coverage area.

Figure 2:
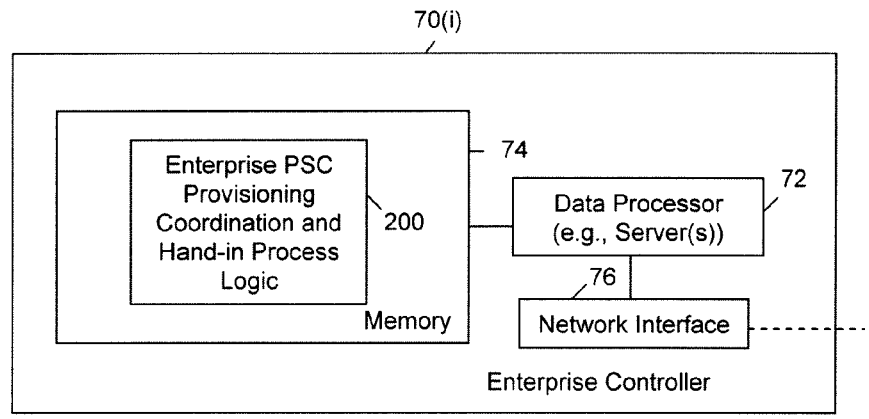
FIG. 2 is an example of a block diagram of an enterprise controller configured with enterprise provisioning primary scrambling code coordination and hand-in process logic.
Figure 3:
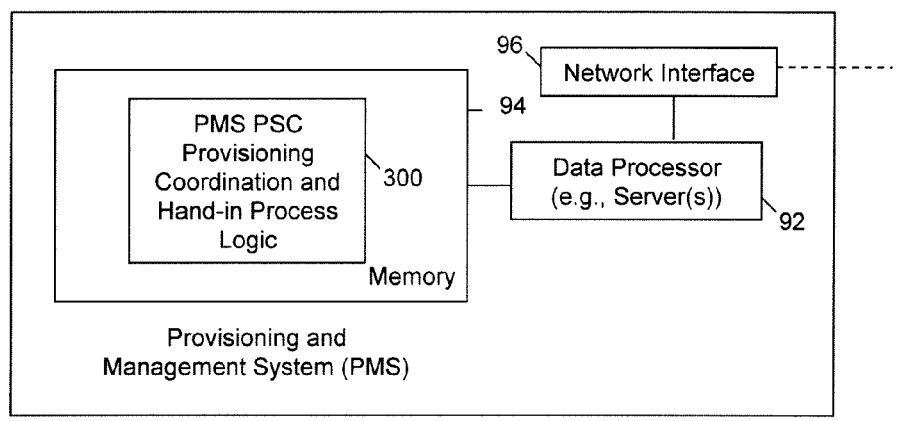
FIG. 3 is an example of a block diagram of a provisioning and management system configured with management system primary scrambling code provisioning coordination and hand-in process.
Figure 4:
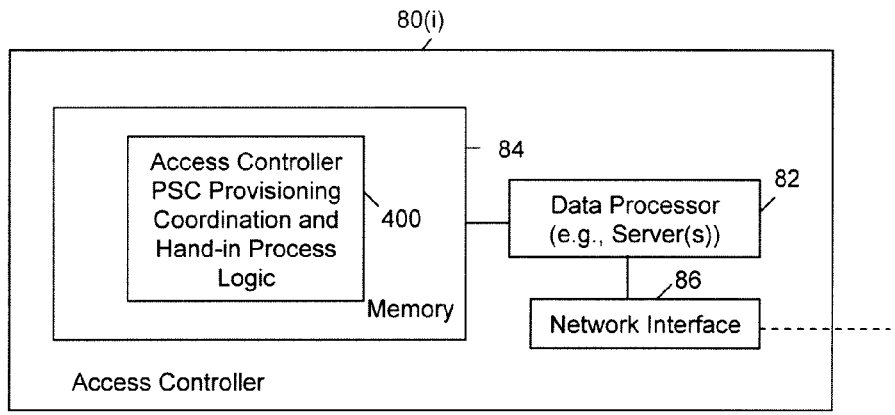
FIG. 4 is an example of a block diagram of an access controller configured with access controller primary scrambling code provisioning coordination and hand-in process.

Reference is now made to FIGS. 2-4 for a description of several network elements that have a role in the techniques described herein. First, FIG. 2 shows a block diagram for an enterprise controller, identified generically by reference numeral 70(i). That is, each of the enterprise controllers shown in FIG. 1 may have the configuration shown in FIG. 2. The enterprise controller comprises a data processor 72 (e.g., computer), memory 74 and a network interface 76. The memory 74 stores software instructions for enterprise PSC provisioning coordination and hand-in process logic 200. The processor 72 executes the instructions for the enterprise PSC provisioning coordination and hand-in process logic 200 to perform various functions described hereinafter. The network interface 76 facilitates communication to and from the enterprise controller via the associated LAN or the Internet 55.

FIG. 3 shows a block diagram for the provisioning and management system (PMS) 90. The PMS comprises a data processor 92 (e.g., computer), memory 84 and network interface 96. The memory 94 stores software instructions for PMS PSC provisioning coordination and hand-in process logic 300. The processor 92 executes the instructions for the PMS PSC provisioning coordination and hand-in process logic 300 to carry out functions described hereinafter. The network interface 96 facilitates communication to and from the PMS via the Internet 55.

FIG. 4 shows a block diagram for an access controller, generically identified by reference number 80(i). Each of the access controllers shown in FIG. 1 may be configured as shown in FIG. 3. The access controller comprises a data processor 82, memory 84 and network interface 86. The memory 84 stores software instructions for access controller PSC provisioning coordination and hand-in process logic 400. The processor 82 executes the instructions for the access controller PSC provisioning coordination and hand-in process logic 400 to carry out functions described hereinafter. The network interface 86 facilitates communication to and from the access controller via the Internet 55.

While a separate diagram is not provided herein for a RAP device, it is to be understood that a RAP device comprises a wireless network transceiver module comprising a radio frequency (RF) transmit and receive section and a baseband signal processing or modem section for baseband signal processing. One of the functions of the baseband signal processing section of the RAP device is to measure the strength of received signals, e.g., strength of beacon signals received from another RAP device or from a macro base station, and to produce receive signal strength information (RSSI) data representative thereof. The baseband signal processing section also extracts the PSC for a received beacon signal.

The overall flow of the PSC provisioning coordination process is described with reference to FIGS. 5 and 6. The relevant functions of each of the process logic in the enterprise controller, access controller, PMS, macro radio network controller, etc., in the PSC provisioning coordination process are described in connection with FIGS. 5 and 6. Process flow for a hand-in is described hereinafter with reference to FIGS. 7-9. The functions identified by reference numerals in the "100's" are functions performed by a RAP device or UE. functions identified by reference numerals in the "200's" are performed by the enterprise controller PSC provisioning coordination and hand-in process logic 200, the functions identified by reference numerals in the "300's" are performed by the PMS PSC provisioning coordination and hand-in process logic 300, and the functions identified by reference numerals in the "300's" are performed by the access controller PSC provisioning coordination and hand-in process logic 400. The functions identified by reference numerals in the "500's" are functions performed by macro radio network controller.

The PSC provisioning coordination process allows for allocation of PSCs in a RAP device deployment so as to handle PSC conflicts when a RAP device registers for service. Many of the more important functions for the PSC provisioning coordination process are handled by an access controller. However, it should be understood that many of the functions described herein may be handled by different entities than those identified, or several functions described as occurring across multiple entities may be consolidated into a single entity.

Figure 5:
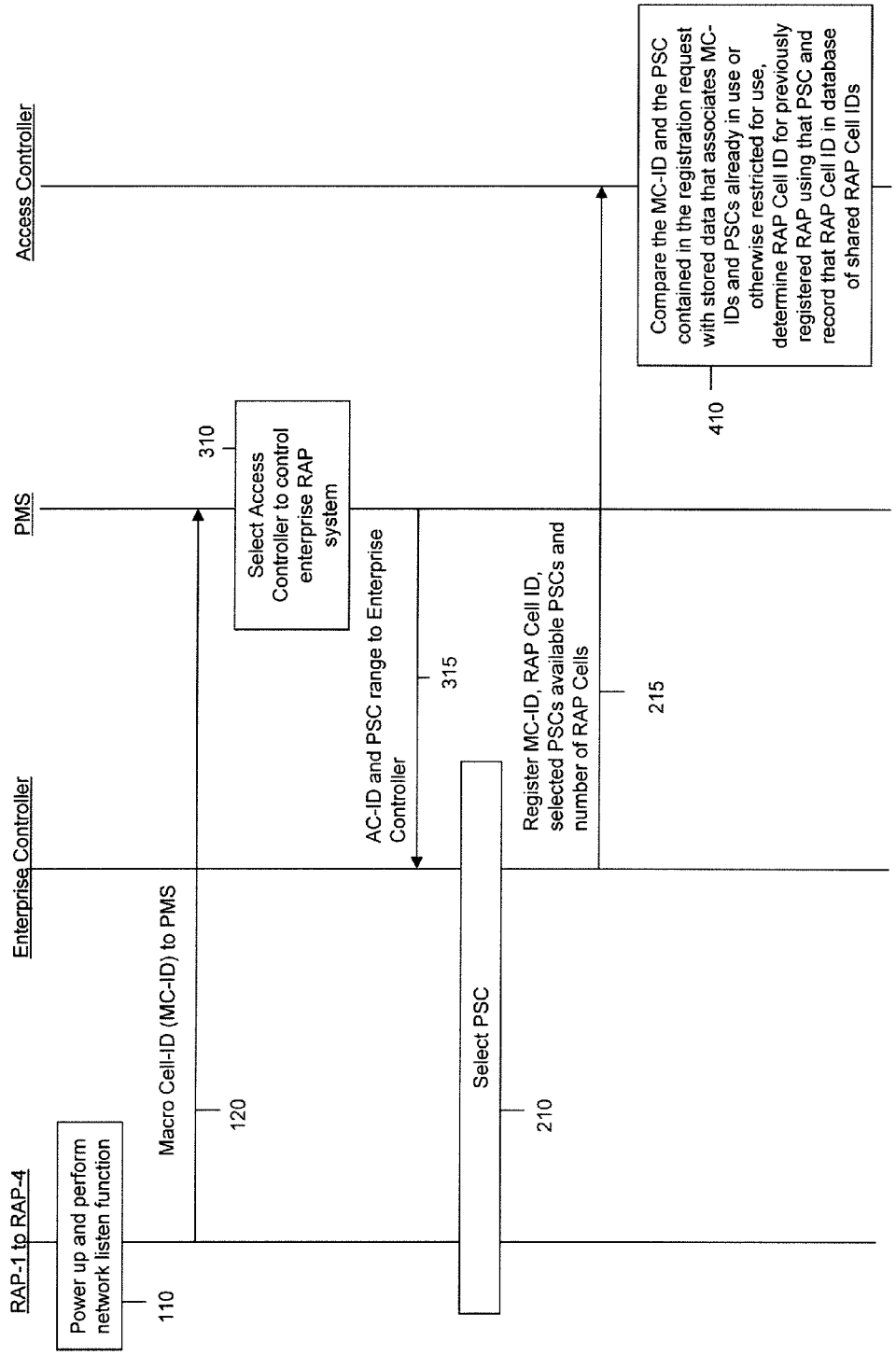
FIGS. 5 and 6 are flow charts illustrating process flow for the primary scrambling code provisioning coordination process.

Reference is now made to FIG. 5 for a description of the PSC provisioning coordination process. The process begins when a RAP device powers on and at 110 performs a network listen function whereby it receives transmission from macro base stations in order to discover the macro base stations that are in its vicinity. When the RAP devices receives a beacon signal transmitted by a macro base station, it extracts the macro cell identifier (MC-ID) from the received signal. If the RAP device detects a beacon signal from multiple macro base stations, it may select one MC-ID based on, for example, the RSSI or the location where the measurement was made. For example, a MC-ID for a macro base station that covers a building entrance/exit may be preferred to another MC-ID received at a higher RSSI by a RAP device that does not cover a building entrance/exit.

At 120, the RAP device sends to the PMS a message containing the MC-ID detected at 110. At 310, the PMS performs a "hash" operation on the received MC-ID and selects the access controller that is to control the enterprise RAP system for the RAP device from which the MC-ID is received. The selected access controller is identified by a selected access controller ID (AC-ID). At 315, the PMS sends to the enterprise controller the selected AC-ID, a range of PSC values that are allocated to the enterprise RAP system and a set of reserved uplink scrambling codes (ULSCs) that are needed to handle conflicting PSC allocations as described hereinafter.

At 210, the RAP device uses its network listen capability again to select the PSC by choosing one with the lowest received power. At 215, the enterprise controller receives from the RAP device the selected PSC and transmits a registration request to its assigned access controller (from function 315). The registration request may be in the form of a message compliant with the 3G TSS 25.469 specification, enhanced to include the MC-ID, a RAP cell ID that identifies the RAP device that is registering, the selected PSC(s), any available but unused PSCs (allocated to the enterprise controller at 315) and the number of RAP devices in the enterprise RAP deployment under the control of the enterprise controller.

At 410, the access controller that receives the registration request compares the MC-ID and the particular PSC contained in the registration request with stored data that associates MC-IDs and PSCs already in use or otherwise restricted for use. This comparison involves determining whether there is a conflict with the PSCs contained in the registration request. There are three possible outcomes the can result from the comparison at 410. First, if the selected PSCs contained in the registration request are unused in the macro cell corresponding to the MC-ID, then registration of the RAP device occurs as normal, following the protocol of TSS 25.469, for example. Second, the access controller may wish to restrict the PSC allocation because, for example, all PSCs are now used in the macro cell. Furthermore, if more than one PSC selected by the RAP is already in use within the macro cell and there are unused PSCs available, then the access controller can restrict the PSC allocation to avoid the conflict by indicating the PSC restrictions to the RAP device. This may be indicated to the RAP device using a registration reject message with additional information to indicate which PSCs are barred or restricted from use by the RAP device. Reception of this rejection message by the enterprise controller will cause the enterprise controller to perform a reselection of the PSCs to be used followed by another registration request that indicates the new PSCs that have been selected and also indicating the restricted PSCs as not being available. The first and second outcomes are not shown in FIGS. 5 and 6 for simplicity.

As indicated at 410 in FIG. 5, when the access controller determines that there is a conflict, i.e., that the PSC received in the registration request is already in use in the macro cell and that no other PSCs are available for the RAP device, the third outcome occurs. The access controller looks up in its stored data to determine the RAP Cell ID for the previously registered RAP device using that PSC and records that RAP Cell ID (for the previously registered RAP device using that particular PSC) in a database of shared RAP Cell IDs. (A RAP Cell ID is an identifier of a RAP device.) Thus, the access controller stores an indication that the RAP Cell ID for the RAP device that has been previously registered with the particular PSC and the macro cell identifier is a shared RAP cell identifier and that the shared radio access cell identifier is associated with more than one radio access point device.

Figure 6:
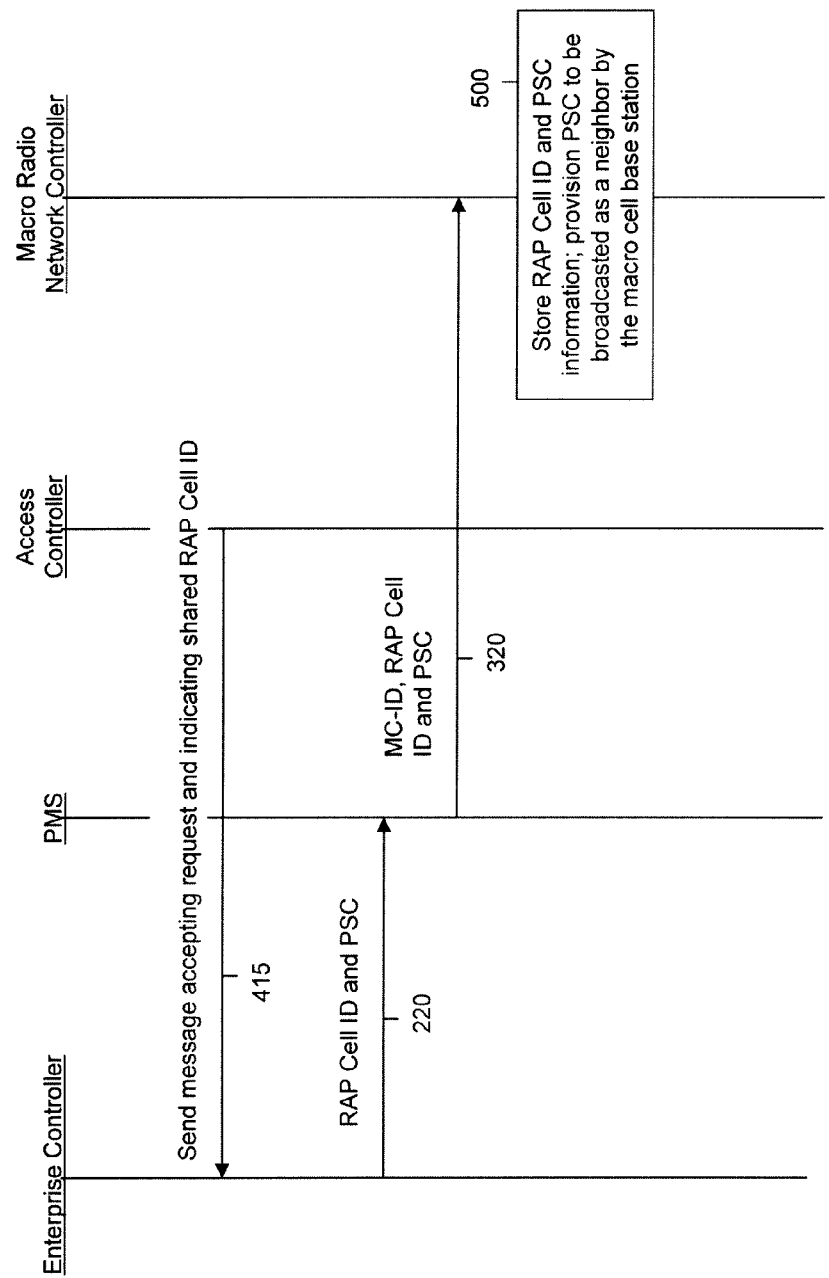

Referring now to FIG. 6, which continues the provisioning process, at 415, the access controller sends a message to the enterprise controller indicating that registration has been accepted and indicating the shared RAP cell ID. At 220, the enterprise controller sends a message to the PMS indicating the shared RAP Cell ID and PSC, and at 320, the PMS sends to the macro radio network controller a message indicating the shared RAP Cell ID and PSC information. In another form, instead of sending a message from the PMS to the macro radio network controller with this information, the macro radio network controller may be configured, by a network administrator person, with the shared RAP Cell ID and MC-ID and PSC information. At 500, the macro radio network controller stores the shared RAP Cell ID and PSC information, and provisions the macro cell base station for that MC-ID to broadcast the PSC as one of its neighbors. That is, at 500, the macro radio network controller configures a macro cell base station corresponding to the MC-ID to broadcast the particular PSC as a neighbor for purposes of handover of service to wireless client devices operating in the coverage area of the macro cell base station. At this point, the provisioning process is complete. Thus, functions 220 and 320 result in a message containing the shared RAP cell identifier, macro cell identifier and the particular PSC to a macro radio network controller which in turn configures a macro cell base station corresponding to the macro cell identifier to broadcast the particular PSC as a neighbor for purposes of handover of service to wireless client devices operating in the coverage area of the macro cell base station.

Figure 7:
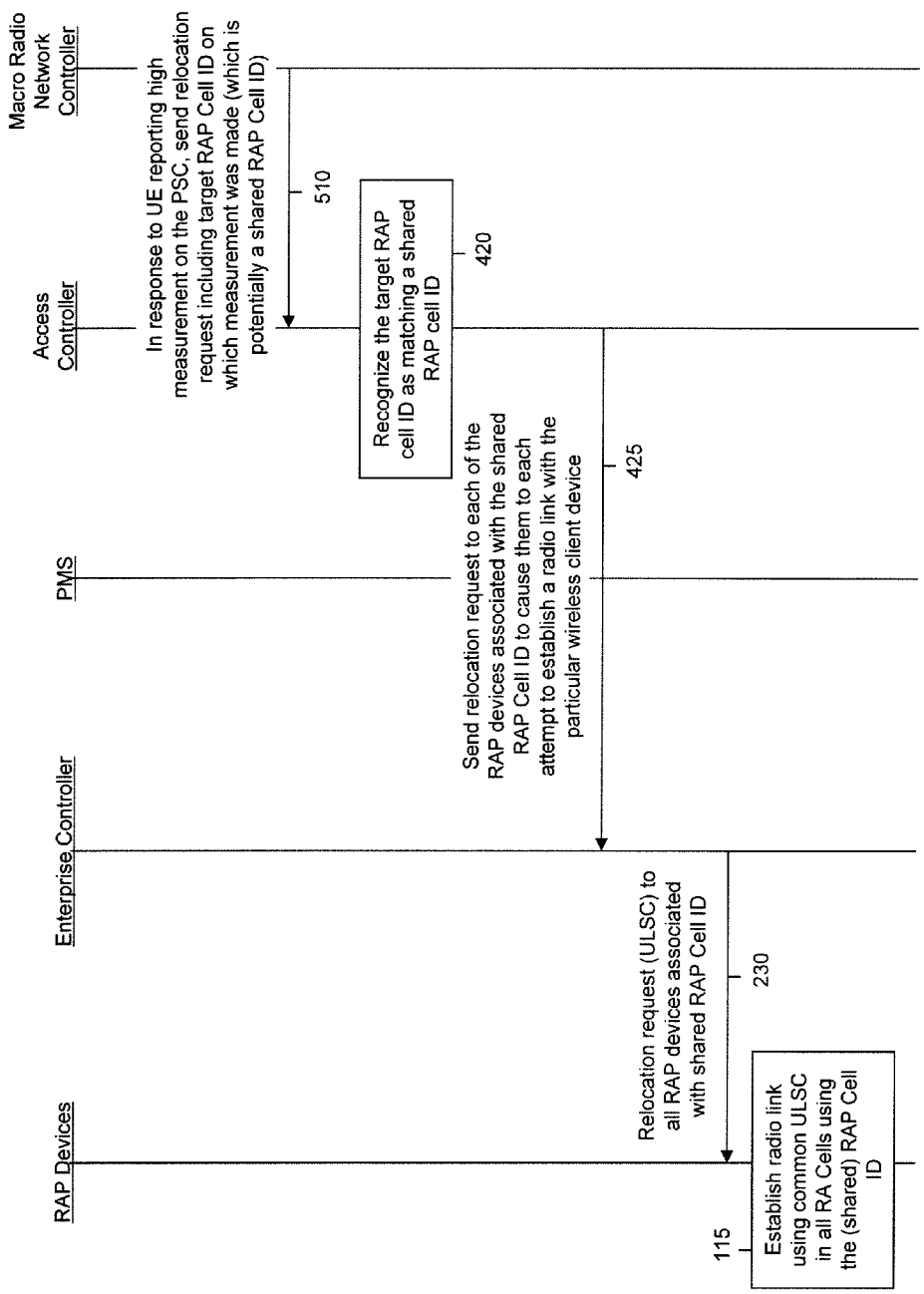
FIGS. 7 and 8 are flow charts illustrating process flow for a hand-in process based on the primary scrambling code provisioning coordination process.
Figure 8:
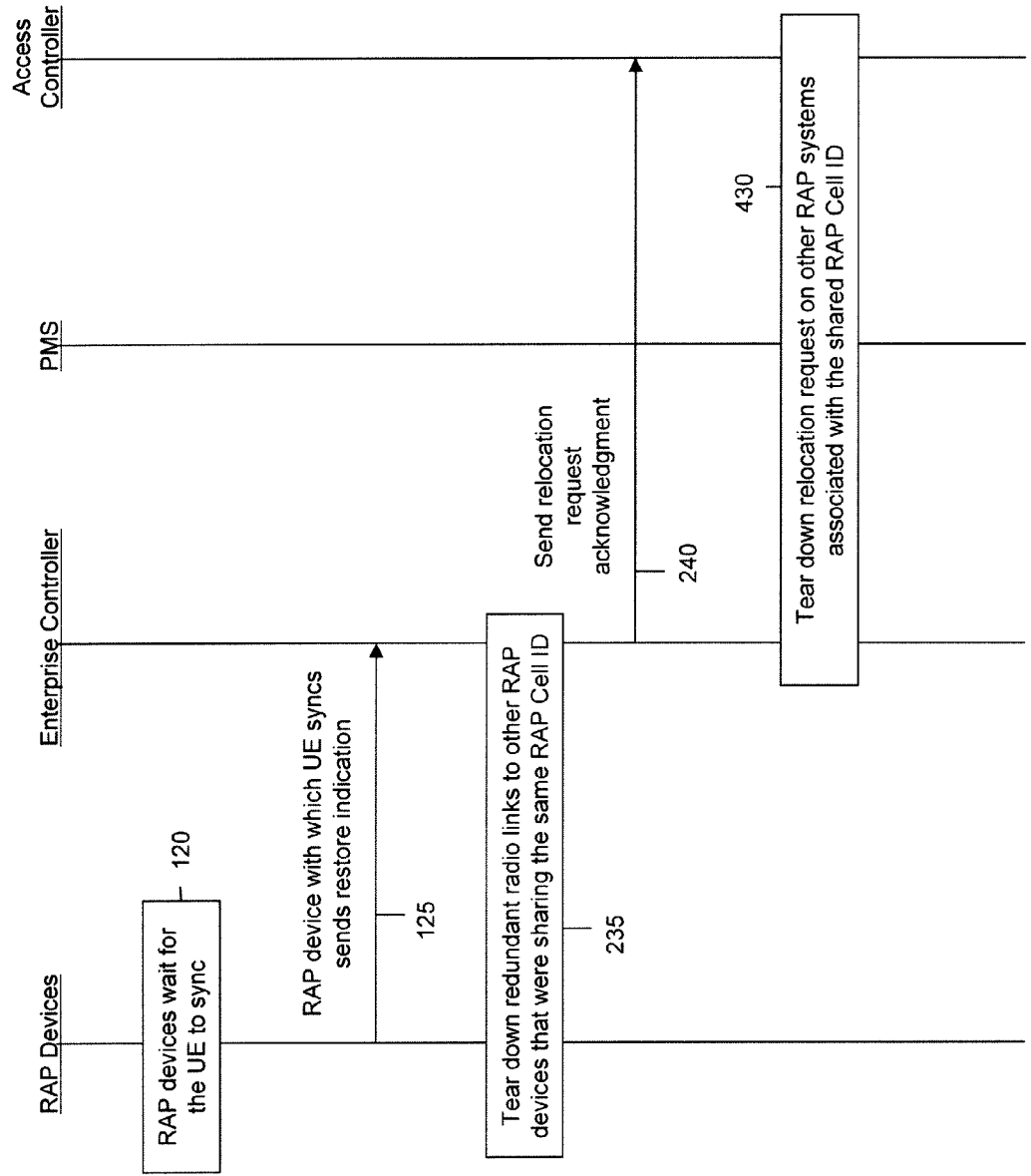
Figure 9:
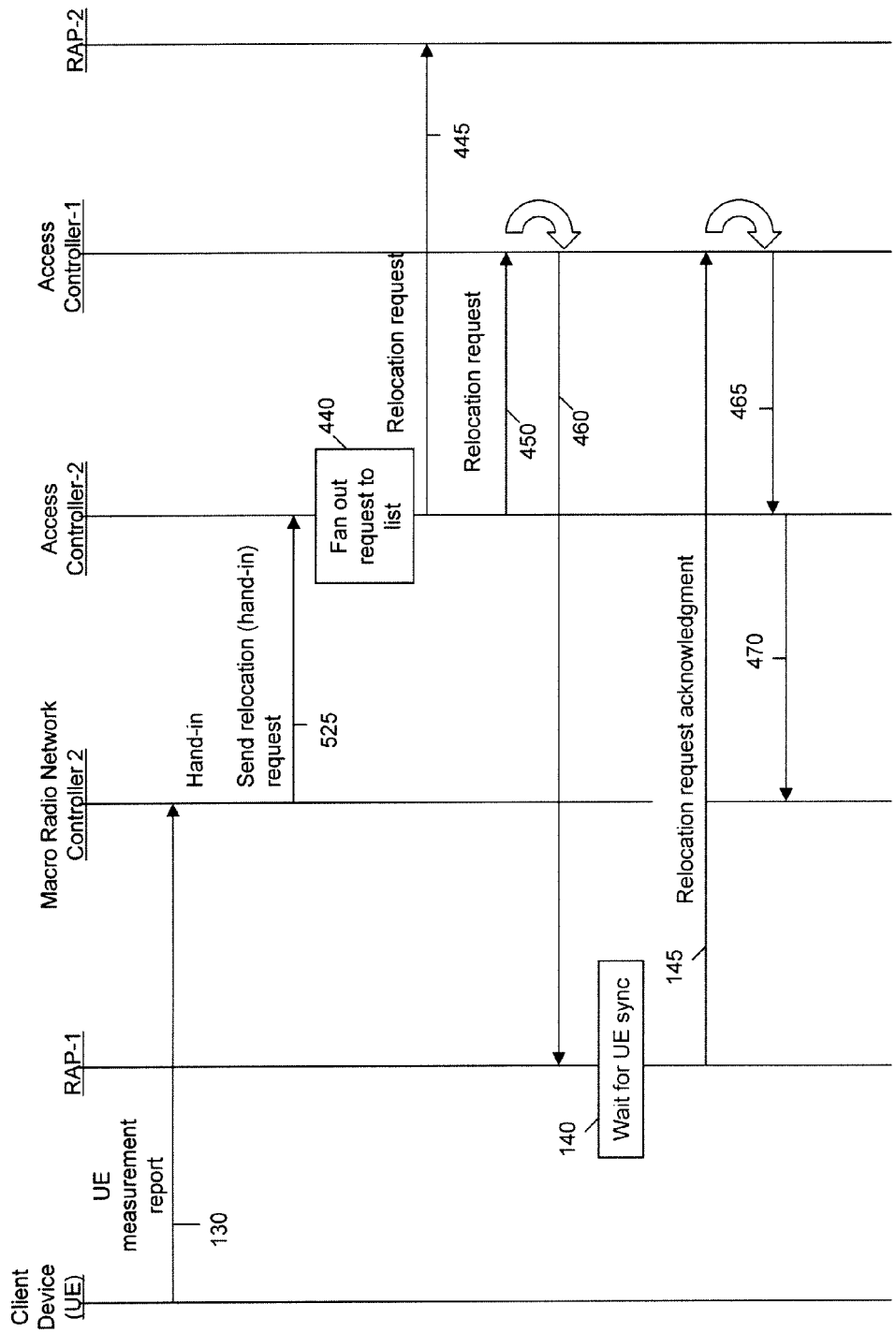
FIG. 9 is a flow chart illustrating process flow for a hand-in process when multiple access controllers are associated with radio access point devices associated with a shared radio access point cell identifier.

Reference is now made to FIGS. 7-9 for a description of the functions performed in the various entities when handing in service to a wireless client device from a macro cell base station to a RAP device. A client device or UE receives a neighbor list broadcasted by a macro cell base station when it is being served by a macro cell base station, and using the information contained in the neighbor list, makes measurements on signals transmitted by other macro cell base stations or RAP devices contained in the neighbor list. The UE sends measurement reports to its serving macro cell base station for the measurements made on signals from neighbors identified in the neighbor list. A measurement report indicates the target PSC (e.g. of the RAP device) for which the measurement is made. When an active UE (i.e., a UE with at least one active voice or data communication session) reports a "high" measurement (e.g., greater than a threshold) for a declared neighbor, the radio network controller serving the macro base station to which the UE is registered generates a Relocation Request message to the target cell id corresponding to the reported PSC. This is all part of conventional hand-in processing. At 510, in response to the UE reporting high measurement on a signal (using a corresponding PSC), the macro radio network controller sends a relocation request including target RAP Cell ID on which the UE made the measurement. This RAP Cell ID is potentially a shared RAP Cell ID.

At 420, the access controller receives from the macro radio network controller the relocation request containing the target RAP cell ID and recognizes or identifies the target RAP Cell ID as matching or corresponding to a shared RAP Cell ID. The access controller had stored this shared RAP Cell ID association at 410 in FIG. 5. In response, at 425, the access controller sends a relocation request to each of the RAP devices associated with the shared RAP Cell ID to cause each of those RAP devices to attempt to establish a radio link with the particular client device (UE) that sent the measurement report that initiated the hand-in sequence.

The access controller is provisioned, a priori, with range of ULSCs and will cycle through the range to allow simultaneous hand-in to the same enterprise RAP device using a shared RAP Cell ID.

To enable handover to RAP devices that are associated with a shared RAP cell ID, the access controller is configured to pre-allocate a collection of handover resource units. Each handover resource unit consists of a ULSC as well as a downlink spreading and scrambling code. To enable multiple simultaneous hand-in requests, the access controller needs to maintain a plurality of the handover resource units. Each handover resource unit has a unique identifier, again, comprises an ULSC and a downlink spreading and scrambling code. The access controller sends the collection or reserved group of handover resource units to each RAP device associated with the shared RAP Cell ID. Thus, each RAP device associated with a common shared RAP Cell ID also reserves the same collection of handover units for the purposes of handover.

In response to receiving a relocation request from the macro radio network controller, which relocation request the access controller determines is for a measurement report made from signals received by a particular wireless client device from a RAP device that is associated with a shared RAP Cell ID, the access controller selects one of the handover resource units in the reserved collection for that shared RAP Cell ID. In making the selection, the access controller first determines when there are no handover resource units available in the reserved collection for that shared RAP Cell ID, due possibly to the number of concurrent hand-in requests exceeding the number of reserved handover resource units in the reserved collection. There are two ways to handle this situation. The first is for the access controller to block or deny the relocation request. This may force the wireless client device to attempt to handover to a different RAP device for which handover resources units may be available. The second is for the access controller to select one of the currently used handover resource units in the reserved collection to allow the particular wireless device seeking handover to achieve handover using the selected handover resource provided that another wireless client device is not attempting to handover to the same RAP device as the particular wireless client device using the same selected handover resource unit at the same time. In the latter case, the particular wireless client may still be able to synchronize correctly with the RAP device provided another client is not trying to connect with the same RAP device using the same resources at the same time.

Thus, at 425, the access controller selects one of the reserved ULSCs as well as a Traffic Flow Combination (TFC) for the hand-in. These ULSCs are temporary scrambling codes used to flag a hand-in event. In another form, different enterprise controllers may select the same reserved ULSC based on, for example, time of day. The access controller relocation request to the RAP contains the handover resource unit identifier for the selected handover resource unit. When the RAP device receives the relocation (hand-in) request, it will assign the handover resource unit based on the handover resource identifier contained in the relocation request, and then the RAP device waits for the particular wireless client device to synchronize to it.

The relocation request sent by the access controller at 425 is augmented to identify it as being for a PSC-conflicted hand-in. For example, the access controller indicates that the selected ULSC and TFC (and possibly the PSC) are associated with a shared RAP Cell ID. The ULSC and TFC contained in the selected handover resource unit are used by the candidate target RAP to finalize the handover procedure.

At 230, the enterprise controller receives the relocation request from the access controller and forwards it to each RAP device associated with the shared RAP Cell ID. At 115, each of the RAP devices notified with the relocation request attempts to establish a radio link by broadcasting with the selected common ULSC.

Upon receiving acknowledgement of the selected handover resource unit from the one or more RAP devices associated with the RAP Cell ID, the access controller relays the selected handover resource unit back to the macro radio network controller which in turn relays the selected handover resource unit, via the serving macro base station, to the particular wireless client device that sent the measurement report which led to the relocation request. When the particular wireless client receives from the serving macro base station the message containing the selected handover resource unit, the particular wireless client device will attempt to synchronize with the target RAP device using the spreading and scrambling codes provided in the selected handover resource unit. Once the particular wireless client device achieves synchronization with the target RAP device, the target RAP device reconfigures the spreading and scrambling codes so that the same codes could be used for a future handover request.

Turning to FIG. 8, at 120, each of the RAP devices waits for the UE to synchronize to it as explained above. The UE will synchronize to the RAP device for which it made the measurement report, but the particular RAP device is not known because it had been broadcasting with a PSC that was shared across multiple RAP devices. At 125, the RAP device to which the UE synchronizes, for example, per the procedures set forth in TSS 25.331, sends a radio link restore indication message to the enterprise controller.

At 235, the enterprise controller sends messages to the other RAP devices that were notified with a relocation request at 230, to "tear down" their radio links using the common ULSC that were associated with the shared RAP Cell ID. In other words, the enterprise controller commands the other RAP devices to stop broadcasting with the ULSC and waiting for a UE to synchronize. The enterprise controller may be configured to trigger a physical channel reconfiguration in order to free the ULSC and to allow it the ULSC to re-used for subsequent hand-in events. Thus, at 235, upon the enterprise controller receiving a notification that hand-in to the particular UE has occurred at one of the multiple RAP devices associated with the shared RAP Cell ID, the enterprise controller sends messages to the other RAP device(s) associated with the shared RAP cell identifier to cause them to terminate attempting to establish a radio link with the particular UE. At 240, the enterprise controller sends a relocation request acknowledgment message to the access controller informing the access controller that the relocation, i.e., hand-in, of the UE has been completed.

At 430, the access controller notifies other RAP cell systems associated with the shared RAP Cell ID that their radio links are not needed for the relocation request and can therefore terminate them. The function 430 is useful if the RAP devices associated with the shared RAP Cell ID are in different RAP cell systems controlled by different enterprise controllers.

This completes a description of the hand-in process for a UE that triggers hand-in at a RAP device that is associated with a share RAP Cell ID. Again, the shared RAP Cell ID concept is employed to deal with the situation when there are insufficient PSCs available and therefore the same PSC needs to be used by multiple RAP devices.

Reference is now made to FIG. 9 for a description of a hand-in process when multiple access controllers are associated with the RAP devices that are sharing a RAP Cell ID. This situation may occur as follows. During the network listen function, i.e., function 110 in FIG. 5, a RAP device scans for beacons from macro cell base stations and forms a list of macro cell base stations that are macro cell neighbors for purposes of hand-out and for sources for hand-in. One of the MC-IDs is designated as a primary MC-ID and the others are designated MC-IDs are designated as secondary MC-IDs. The RAP device determines on its own, or is assigned by the PMS, an access controller based on primary MC-ID. For each primary MC-ID there is one access controller (per PSC) responsible for handling hand-in requests for that macro cell. The RAP device sends the list of secondary MC-IDs to its serving access controller. The access controller stores a list of RAP device identifiers (RAP Cell IDs), indexed by MC-ID and PSC. When a hand-in request arrives from a macro cell with a MC-ID hashed by the PSC, the access controller "fans" out the relocation request to the RAP devices in the list. If the serving access controller handles the secondary MC-IDS provided then it will update the fan-out lists for the secondary MC-IDs. On the other hand, when the serving access controller does not handle a secondary MC-ID, then it contacts the serving access controller for that MC-ID and directs that access controller to update its fan-out lists. In other words, when a particular macro cell base station corresponding to a particular secondary MC-IC is not under control of the access controller, the access controller sends a message to the other access controller that controls the particular macro cell base station, the message instructing the other access controller to include in a list of RAP devices that are associated with the secondary MC-ID to be sent a relocation request when a hand-in request is received by the other access controller for a specified PSC. For example, MC-ID 1 is a primary MC-ID and MC-ID 2 is a secondary MC-ID. Access controller-1 handles MC-ID 1 and access controller handles MC-ID 2. Access controller-1 contacts access controller-2 and directs access controller-2 to add access controller-1 to its "fan-out" list for a specified PSC.

The hand-in process flow of FIG. 9 is now described. In the example of FIG. 9, macro cell-1 is handled by access controller-1 and macro cell-2 is handled by access controller-2. Furthermore, access controller-1 controls RAP-1 and access controller-2 controls RAP-2. In this example, it is assumed that RAP-1 is in the neighbor list broadcasted by the macro cell base station for macro cell-1 and by the macro cell base station for macro cell-2. Hand-in requests from macro cell-1 are handled as described above in connection with FIGS. 7 and 8. Thus, FIG. 9 illustrates how hand-in requests from macro cell-2 are handled. At 130, a UE measurement report is sent to a macro radio network controller that controls the serving macro cell base station for the UE that sent the measurement report. Based on the measurement report, the macro radio network controller determines to initiate hand-in for the UE. At 525, the macro radio network controller sends out a relocation request to the access controller associated with the RAP device identified in the measurement report, which in this example, is access controller-2.

Access controller-2 refers to its stored list of RAP devices, indexed by MC-IC and PSC, and determines that a hand-in request is from an MC-ID with a RAP Cell ID hashed by a PSC, and at 440, fans out the request to other RAP devices associated with that MC-ID, e.g., RAP-2 as indicated at 445 in FIG. 9. In addition, the access controller-2 determines whether another access controller handles the MC-ID, and at 450, sends the relocation request to access controller 1. Access controller-2 knows to do this because access controller-1 had directed access controller-2 to add it to its fan-out list for a specified PSC, which corresponds to the PSC for which the measurement report was generated at 130.

Upon access controller-1 receiving the relocation request, at 460 it forwards the relocation request to RAP-1 based on information stored for the specified PSC and MC-ID. At 140, RAP-1 waits for UE synchronization. Assuming the UE synchronizes to RAP-1, at 145 RAP-1 sends a relocation request acknowledgment to access controller-1. At 465, access controller-1 forwards the relocation request acknowledgment to access controller-2, and at 470, access controller-2 forwards the relocation request acknowledgment to the macro radio network controller-2. The remaining tear down procedures, like those described in connection with FIG. 8, are performed, but are not repeated again in connection with FIG. 9.

The techniques described herein allows for more than a fixed number, e.g., 32, of RAP devices to be deployed within a macro cell, particularly where measurement reports cannot unambiguously identify a target RAP device.

The process logic described herein, i.e., process logic 200, 300 and 400, may take any of a variety of forms, so as to be encoded in one or more tangible media for execution. For example, the logic may be in the form of software code instructions stored in memory for execution by the processor to perform the functions described herein. In another example, the logic may be in the form of digital logic gates, a programmable gate array device or other programmable or fixed logic device, configured to perform the functions described herein.

Although the apparatus, method, and logic are illustrated and described herein as embodied in one or more specific examples, it is nevertheless not intended to be limited to the details shown, since various modifications and structural changes may be made therein without departing from the scope of the apparatus, method, and logic and within the scope and range of equivalents of the claims. Accordingly, it is appropriate that the appended claims be construed broadly and in a manner consistent with the scope of the apparatus, logic, and method, as set forth in the following claims.

What is claimed is:

1. A method comprising:
   at a controller apparatus, receiving a registration request from a radio access point device configured to operate in a wireless network to serve one or more wireless client devices in the wireless network in respective relatively small coverage areas, wherein the registration request comprises a macro cell identifier associated with a macro base station apparatus configured to operate in the wireless network to serve one or more wireless client devices in a relatively large coverage area, a radio access point cell identifier associated with the radio access point device, and a particular primary scrambling code selected for use by the radio access point device;
   comparing the macro cell identifier and the particular primary scrambling code contained in the registration request received from the radio access point device with stored data that associates macro cell identifiers and primary scrambling codes already in use or otherwise restricted for use; and
   when, based on said comparing, it is determined that the particular primary scrambling code is already in use for the macro cell identifier in the registration request, then determining a radio access point cell identifier for the radio access point device that has been previously registered with the particular primary scrambling code and macro cell identifier; and
   storing an indication that the radio access point cell identifier for the radio access point device that has been previously registered with the particular primary scrambling code is a shared radio access point cell identifier and that the shared radio access point cell identifier is associated with more than one radio access point device.

2. The method of claim 1, and further comprising configuring the macro radio network controller with the shared radio access point cell identifier, macro cell identifier and the particular primary scrambling code, and wherein in response thereto the macro radio network controller configures a macro cell base station corresponding to the macro cell identifier to broadcast the particular primary scrambling code as a neighbor for purposes of handover of service to wireless client devices operating in the coverage area of the macro cell base station.

3. The method of claim 1, and further comprising sending a message containing the shared radio access point cell identifier, macro cell identifier and the particular primary scrambling code to a macro radio network controller which in turn configures a macro cell base station corresponding to the macro cell identifier to broadcast the particular primary scrambling code as a neighbor for purposes of handover of service to wireless client devices operating in the coverage area of the macro cell base station.

4. The method of claim 3, and further comprising receiving from the macro radio network controller a relocation request associated with a measurement made by a particular wireless client device in the coverage area of the macro cell base station based on a signal using the particular primary scrambling code transmitted from a radio access point device, wherein the relocation request comprises a target radio access point identifier.

5. The method of claim 4, wherein in response to receiving the relocation request containing the target radio access point cell identifier, recognizing the target radio access point cell identifier as matching the shared radio access point cell identifier, and sending a relocation request to each of the radio access point devices associated with the shared radio access point cell identifier to cause them to each attempt to establish a radio link with the particular wireless client device.

6. The method of claim 5, and further comprising allocating a collection of handover resource units for each radio access point device associated with the shared radio access point cell identifier, each handover resource unit having a unique identifier and comprising an uplink spreading and scrambling code and a downlink spreading and scrambling code; sending the collection of handover resource units to each radio access point device associated with the shared radio access point cell identifier; in response to receiving the relocation request from the macro radio network controller, selecting one of the handover resource units from the collection and sending an identifier of the selected handover resource unit to the radio access point device corresponding to the target radio access point identifier to cause that radio access point device to assign the selected handover resource unit for synchronization with the particular wireless client device; sending the selected handover resource unit to the macro radio network controller that in turn sends the selected handover resource unit to the particular wireless client device to allow it to synchronize to the radio access point device corresponding to the target radio access point identifier.

7. The method of claim 6, and further comprising upon receiving an acknowledgment from radio access point device corresponding to the target identifier that the particular wireless client device has synchronized to it, releasing the selected handover resource unit to allow it for use for subsequent handover requests.

8. The method of claim 6, and further comprising, in response to receiving the relocation request, determining whether there are handover resource units available in the collection of handover resource units, and when it is determined that there are no handover resource units available in the collection of handover resource units, then performing one of: (1) denying the relocation request, and (2) selecting one of the handover resource units in the collection to allow the particular wireless client device to achieve handover using the selected handover resource unit provided another wireless client device is not attempting to handover to the same radio access point device as the particular wireless client device using the selected handover resource unit at the same time.

9. The method of claim 1, wherein in response to receiving a notification that hand-in for the particular wireless client device has occurred at one of the multiple radio access point devices associated with the shared radio access point cell identifier, further comprising sending messages to the other radio access point device(s) associated with the shared radio access point cell identifier to cause them to terminate attempting to establish a radio link with the particular wireless client device.

10. The method of claim 1, and further comprising receiving from a radio access point device a list of a plurality of macro identifiers for a plurality of macro cell base stations detected by the radio access point device, one of the plurality of identifiers being designated a primary macro cell identifier and the others being designated secondary macro cell identifiers.

11. The method of claim 10, and further comprising determining whether a particular macro cell base station corresponding to a particular secondary macro cell identifier is under control of another controller apparatus, and if so, sending a message to another controller apparatus that controls the particular macro cell base station instructing the other controller apparatus to store a list of radio access point devices that are associated with the secondary macro cell identifier to be sent a relocation request when a hand-in request is received by the other controller apparatus for a specified primary scrambling code.

12. An apparatus comprising:
a network interface configured to enable communication over a wired network;
a processor configured to couple to the network interface, wherein the processor is configured to:
receive via the network interface a registration request from a radio access point device configured to operate in a wireless network to serve one or more wireless client devices in the wireless network in respective relatively small coverage areas, wherein the registration request comprises a macro cell identifier associated with a macro base station apparatus configured to operate in the wireless network to serve one or more wireless client devices in a relatively large coverage area, a radio access point cell identifier associated with the radio access point device, and a particular primary scrambling code selected for use by the radio access point device;
compare the macro cell identifier and the particular primary scrambling code contained in the registration request received from the radio access point device with stored data that associates macro cell identifiers and primary scrambling codes already in use or otherwise restricted for use to determine whether the particular primary scrambling code is already in use for the macro cell identifier in the registration request; and
when it is determined that the particular primary scrambling code is already in use for the macro cell identifier in the registration request, determine a radio access point cell identifier for the radio access point device that has been previously registered with the particular primary scrambling code and macro cell identifier; and
store an indication that the radio access point cell identifier for the radio access point device that has been previously registered with the particular primary scrambling code is a shared radio access point cell identifier and that the shared radio access point cell identifier is associated with more than one radio access point device.

13. The apparatus of claim 12, wherein the processor is configured to send, via the network interface, a message containing the shared radio access point cell identifier, macro cell identifier and the particular primary scrambling code to a macro radio network controller which in turn configures a macro cell base station corresponding to the macro cell identifier to broadcast the particular primary scrambling code as a neighbor for purposes of handover of service to wireless client devices operating in the coverage area of the macro cell base station.

14. The apparatus of claim 13, wherein the processor is configured to receive from the macro radio network controller, via the network interface, a relocation request associated with a measurement made by a particular wireless client device in the coverage area of the macro cell base station based on a signal using the particular primary scrambling code transmitted from a radio access point device, wherein the relocation request comprises a target radio access point identifier.

15. The apparatus of claim 14, wherein in response to receiving the relocation request containing the target radio access point cell identifier, the processor is configured to identify the target radio access point cell identifier as the shared radio access point cell identifier, and to send a relocation request to each of the radio access point devices associated with the shared radio access point cell identifier to cause them to each attempt to establish a radio link with the particular wireless client device.

16. The apparatus of claim 12, wherein in response to receive a notification request via the network interface indicating that hand-in for the particular wireless client device has occurred at one of the multiple radio access point devices associated with the shared radio access point cell identifier, the processor is configured to send messages to the other radio access point device(s) associated with the shared radio access point cell identifier to cause them to terminate attempting to establish a radio link with the particular wireless client device.

17. The apparatus of claim 12, wherein the processor is further configured to receive from a radio access point device a list of a plurality of macro identifiers for a plurality of macro cell base stations detected by the radio access point device, one of the plurality of identifiers being designated a primary macro cell identifier and the others being designated secondary macro cell identifiers, determine whether a particular macro cell base station corresponding to a particular secondary macro cell identifier is under control of another controller apparatus, and if so, send a message to another controller apparatus that controls the particular macro cell base station instructing the other controller apparatus to store a list of radio access point devices that are associated with the secondary macro cell identifier to be sent a relocation request when a hand-in request is received by the other controller apparatus for a specified primary scrambling code.

18. Logic encoded in one or more tangible media for execution and when executed operable to:

receive at a controller apparatus a registration request from a radio access point device configured to operate in a wireless network to serve one or more wireless client devices in the wireless network in respective relatively small coverage areas, wherein the registration request comprises a macro cell identifier associated with a macro base station apparatus configured to operate in the wireless network to serve one or more wireless client devices in a relatively large coverage area, a radio access point cell identifier associated with the radio access point device, and a particular primary scrambling code selected for use by the radio access point device;

compare the macro cell identifier and the particular primary scrambling code contained in the registration request received from the radio access point device with stored data that associates macro cell identifiers and primary scrambling codes already in use or otherwise restricted for use to determine whether the particular primary scrambling code is already in use for the macro cell identifier in the registration request; and when it is determined that the particular primary scrambling code is already in use for the macro cell identifier in the registration request, determine a radio access point cell identifier for the radio access point device that has been previously registered with the particular primary scrambling code and macro cell identifier; and store an indication that the radio access point cell identifier for the radio access point device that has been previously registered with the particular primary scrambling code is a shared radio access point cell identifier and that the shared radio access point cell identifier is associated with more than one radio access point device.

19. The logic of claim 18, and further comprising logic that is configured to send a message containing the shared radio access point cell identifier, macro cell identifier and the particular primary scrambling code to a macro radio network controller which in turn configures a macro cell base station corresponding to the macro cell identifier to broadcast the particular primary scrambling code as a neighbor for purposes of handover of service to wireless client devices operating in the coverage area of the macro cell base station.

20. The logic of claim 19, and further comprising logic configured to receive from the macro radio network controller, a relocation request associated with a measurement made by a particular wireless client device in the coverage area of the macro cell base station based on a signal using the particular primary scrambling code transmitted from a radio access point device, wherein the relocation request comprises a target radio access point identifier.

21. The logic of claim 20, and further comprising logic that is configured to, in response to receiving the relocation request containing the target radio access point cell identifier, identify the target radio access point cell identifier as the shared radio access point cell identifier, and to send a relocation request to each of the radio access point devices associated with the shared radio access point cell identifier to cause them to each attempt to establish a radio link with the particular wireless client device.

22. The logic of claim 21, and further comprising logic that is configured to, in response to receiving a notification request indicating that hand-in for the particular wireless client device has occurred at one of the multiple radio access point devices associated with the shared radio access point cell identifier, send messages to the other radio access point device(s) associated with the shared radio access point cell identifier to cause them to terminate attempting to establish a radio link with the particular wireless client device.

23. The logic of claim 18, and further comprising logic configured to receive from a radio access point device a list of a plurality of macro identifiers for a plurality of macro cell base stations detected by the radio access point device, one of the plurality of identifiers being designated a primary macro cell identifier and the others being designated secondary macro cell identifiers, determine whether a particular macro cell base station corresponding to a particular secondary macro cell identifier is under control of another controller apparatus, and if so, send a message to another controller apparatus that controls the particular macro cell base station instructing the other controller apparatus to store a list of radio access point devices that are associated with the secondary macro cell identifier to be sent a relocation request when a hand-in request is received by the other controller apparatus for a specified primary scrambling code.

* * * * *